United States Patent
Basile et al.

(10) Patent No.: US 10,066,708 B2
(45) Date of Patent: Sep. 4, 2018

(54) EXTERNAL SPRING TO INCREASE TENSION ON BELT TENSIONER FOR INTERNAL COMBUSTION ENGINE

(71) Applicant: Ford Global Technologies, LLC, Dearborn, MI (US)

(72) Inventors: James M. Basile, Dundee, MI (US); Scott Willis, Gibraltar, MI (US); Joseph Alan Skrobowski, New Boston, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 113 days.

(21) Appl. No.: 15/228,917

(22) Filed: Aug. 4, 2016

(65) Prior Publication Data

US 2018/0038457 A1 Feb. 8, 2018

(51) Int. Cl.
*F16H 7/12* (2006.01)
*F16H 7/08* (2006.01)

(52) U.S. Cl.
CPC ... *F16H 7/1281* (2013.01); *F16H 2007/0804* (2013.01); *F16H 2007/0842* (2013.01); *F16H 2007/0865* (2013.01); *F16H 2007/0893* (2013.01)

(58) Field of Classification Search
CPC ........... F16H 7/1281; F16H 2007/0806; F16H 2007/081; F16H 2007/0893; F16H 7/1218
USPC ........................................................ 474/135
See application file for complete search history.

(56) References Cited

U.S. PATENT DOCUMENTS

| | | | | |
|---|---|---|---|---|
| 855,237 | A * | 5/1907 | Dunn | 310/75 R |
| 1,557,486 | A * | 10/1925 | Valentine | F16H 7/1281 474/135 |
| 1,835,617 | A * | 12/1931 | Stewart | F16H 7/1281 474/135 |
| 2,663,195 | A * | 12/1953 | Horan | F16H 7/1281 474/135 |
| 3,374,686 | A * | 3/1968 | Brewer | F16H 7/129 474/135 |

(Continued)

FOREIGN PATENT DOCUMENTS

| | | |
|---|---|---|
| EP | 0150893 A1 | 8/1985 |
| EP | 0478267 A1 | 4/1992 |
| JP | 10311394 A | 11/1988 |

*Primary Examiner* — Henry Y Liu
(74) *Attorney, Agent, or Firm* — LeClairRyan

(57) ABSTRACT

An easily attached and highly tunable spring arrangement for use with existing front end accessory drive automatic belt tensioners is provided. The spring arrangement of the disclosed inventive concept includes an external spring that can be attached to tensioners to provide a specifically desired amount of additional tension. The spring is flat or round and is externally mounted, conforming to the outer dimension of a portion of the tensioner. The spring can be used on existing tensioner-to-engine bosses using conventional fasteners. The spring includes an attachment end and a biasing end. The attachment end includes at least one bolt sleeve that is formed as part of or is fitted to the external spring by welding. The biasing end contacts the outside of the front end accessory drive automatic belt tensioner at an area adjacent the tensioner pulley. The spring length, material and thickness may be varied for proper tension.

13 Claims, 9 Drawing Sheets

(56) References Cited

U.S. PATENT DOCUMENTS

| | | | | |
|---|---|---|---|---|
| 4,033,196 A | * | 7/1977 | Maeda | F16H 7/1281 474/135 |
| 4,069,719 A | * | 1/1978 | Cancilla | B62M 9/16 474/134 |
| 4,121,475 A | * | 10/1978 | McIlwain | F16H 7/1281 474/135 |
| 4,312,267 A | * | 1/1982 | Shenberger | F16H 7/1281 100/179 |
| 4,351,636 A | * | 9/1982 | Hager | F02B 67/06 474/135 |
| 4,571,223 A | * | 2/1986 | Molloy | F16H 7/1281 474/112 |
| 4,605,387 A | * | 8/1986 | Okubo | F16H 7/1281 474/112 |
| 4,713,045 A | * | 12/1987 | Kodama | F16H 7/1281 474/135 |
| 4,721,495 A | * | 1/1988 | Kan | F16H 7/1236 474/135 |
| 4,816,012 A | * | 3/1989 | Bytzek | F16H 7/1218 474/112 |
| 4,822,321 A | * | 4/1989 | Webb | F02B 67/06 474/117 |
| 4,822,322 A | * | 4/1989 | Martin | F16H 7/129 474/135 |
| 4,832,665 A | * | 5/1989 | Kadota | F16H 7/1227 474/112 |
| 4,917,654 A | * | 4/1990 | Edwards | F16H 7/1281 474/133 |
| 5,131,889 A | * | 7/1992 | Meckstroth | F02B 67/06 474/117 |
| 5,207,620 A | * | 5/1993 | Yamamoto | F16H 7/1236 474/110 |
| 5,256,113 A | * | 10/1993 | Bushman | F02B 67/06 474/135 |
| 5,288,276 A | * | 2/1994 | Golovatgai-Schmidt | F01L 1/02 474/133 |
| 5,345,850 A | * | 9/1994 | Neitzell | B23D 55/10 474/135 |
| 5,370,586 A | * | 12/1994 | Thomsen | F16H 7/1281 267/155 |
| 5,591,094 A | * | 1/1997 | Farmer | F16H 7/1218 474/117 |
| 5,702,315 A | * | 12/1997 | Sakai | F16H 7/1227 474/110 |
| 5,776,025 A | * | 7/1998 | Labudde | F16H 7/1281 474/133 |
| 5,935,032 A | * | 8/1999 | Bral | F16H 7/1218 474/117 |
| 5,938,552 A | * | 8/1999 | Serkh | F16H 7/1218 474/117 |
| 5,957,795 A | * | 9/1999 | Hawes | F16H 7/1281 474/101 |
| 6,039,664 A | * | 3/2000 | Schmid | F16C 11/04 474/101 |
| 6,450,907 B1 | * | 9/2002 | Serkh | F16H 7/1236 474/117 |
| 7,090,606 B2 | * | 8/2006 | Dec | F16H 7/1281 474/117 |
| 8,002,657 B2 | * | 8/2011 | Antchak | F16H 7/1218 474/101 |
| 8,060,968 B2 | * | 11/2011 | Babb | B08B 9/045 15/104.33 |
| 8,142,313 B2 | * | 3/2012 | Suchecki | F02B 67/06 474/109 |
| 8,419,576 B2 | * | 4/2013 | Sauermann | F16H 7/1281 474/135 |
| 8,460,140 B2 | * | 6/2013 | Joslyn | F16H 7/1218 192/105 CD |
| 8,523,720 B2 | * | 9/2013 | Reinhart | F16H 7/0848 29/525.01 |
| 8,545,352 B2 | * | 10/2013 | Lannutti | F16H 7/1218 474/115 |
| 8,562,466 B2 | * | 10/2013 | Mevissen | F16H 7/1218 474/112 |
| 8,568,259 B2 | * | 10/2013 | Robbins | F16H 7/1281 474/135 |
| 8,602,930 B2 | * | 12/2013 | Deneszczuk | F16H 7/1281 474/112 |
| 8,840,495 B2 | * | 9/2014 | Comsa | F01L 1/02 474/110 |
| 8,888,626 B2 | * | 11/2014 | deJong | F16H 7/129 474/133 |
| 8,968,128 B2 | * | 3/2015 | Wolf | F16H 7/1281 474/135 |
| 9,297,445 B2 | * | 3/2016 | Kees | F02N 11/006 |
| 9,416,853 B2 | * | 8/2016 | Wolf | F02B 67/06 |
| 9,841,087 B2 | * | 12/2017 | Hartmann | F16H 7/1281 |
| 2004/0227400 A1 | * | 11/2004 | Kraus | F16H 7/1209 305/143 |

\* cited by examiner

EXTERNAL SPRING TO INCREASE TENSION ON BELT TENSIONER FOR INTERNAL COMBUSTION ENGINE

TECHNICAL FIELD

The disclosed inventive concept relates generally to pulley systems for vehicle engines. More particularly, the disclosed inventive concept relates to an external spring for increasing tension output of a front end accessory drive automatic belt tensioner. The external spring is preferably a single strap composed of spring steel that assists the existing front end accessory drive automatic belt tensioner.

BACKGROUND OF THE INVENTION

The modern internal combustion engine usually incorporates a pulley drive system for powering accessories driven by the engine crankshaft. The accessories typically include an air conditioning compressor, a power steering pump, a water pump, and an alternator. A front end accessory drive belt is trained around pulleys to supply power from the crankshaft of the engine to the accessories. The drive belt makes frictional contact with the face of the pulleys. The drive belt is most often a flexible reinforced polymeric belt.

Each of the accessories requires a driven pulley. In addition, operating a number of accessories, particularly with a serpentine drive belt, requires that the belt be handled carefully to allow placement of the belt in the locations needed to drive the accessories without slippage. It is necessary to maintain the proper tension in this belt, thus ensuring both prevention of slip at the accessory pulleys or at the crankshaft pulley and long life for the belt.

A variety of arrangements are known for establishing and maintaining the desired tension on the belt. The most common arrangement is the front end accessory drive automatic belt tensioner that includes a pivotable arm having a pulley at one end. The other end of the arm is pivotably attached to a housing that attached to the front of the engine block. The housing includes an internal clock spring that provides tension. The front end accessory drive automatic belt tensioner ensures that the belt is placed under a constant tension that is maintained regardless expansion and contraction of the belt itself and of the other engine components which can affect belt tension.

A challenge faced by the industry is that there is no known generic front end accessory drive automatic belt tensioner that adequately respond to the differences between engines. This is because front end accessory drive systems typically have unique accessory and pulley locations on the engine. The front end accessory drive automatic belt tensioner used today to provide and maintain belt tension to drive the accessories is typically unique for each engine and is designed for the specific accessories initially intended for that engine/program. Changing or adding accessories to locations from the initial design can be done, but very often this requires a new tensioner design for each arrangement in order for the system to achieve optimum functionality. The individualized tensioner results in additional cost and complexity for both manufacturing and service.

As in so many areas of vehicle technology there is always room for improvements related to the design of a pulley system for use in an internal combustion engine. Particularly, it would be advantageous to provide a tensioning system in which proper belt tension is constantly applied to the belt system of a given drive and accessory arrangement.

SUMMARY OF THE INVENTION

The disclosed inventive concept overcomes the problems of known belt tensioners for internal combustion engine by providing an easily attached and highly tunable spring arrangement. The arrangement of the disclosed inventive concept overcomes the need of present tensioners to be entirely re-tooled in order to provide a proper tension to a modified FEAD system. The tensioner arrangement of the disclosed inventive concept includes an external spring that can be attached to existing front end accessory drive automatic belt tensioners.

The spring arrangement of the disclosed inventive concept is preferably a flat spring composed of spring steel although the spring may also be round in cross section. The spring is configured so as to conform to the outer dimension of a portion of the front end accessory drive automatic belt tensioner. The spring of the disclosed inventive concept is an externally-mounted spring that is readily adaptable for use on existing tensioner-to-engine bosses using conventional fasteners.

The external spring for a belt tensioner includes a fastening end and a biasing end. The fastening end includes at least one bolt sleeve that is formed as part of or is fitted to the external spring by a method of attachment such as welding. The biasing end contacts the outside of the front end accessory drive automatic belt tensioner at an area adjacent the tensioner pulley, thereby providing additional belt tension on the system.

The length, material and thickness of the spring may be adapted and tuned for each particular engine configuration, thus avoiding the expense of re-tooling existing front end accessory drive automatic belt tensioners. Accordingly, use of the external spring of the disclosed inventive concept provides for a highly- and readily-adaptable arrangement requiring no changes to existing front end accessory drive automatic belt tensioner arrangements except for replacing existing fasteners with longer fasteners.

The above advantages and other advantages and features will be readily apparent from the following detailed description of the preferred embodiments when taken in connection with the accompanying drawings.

BRIEF DESCRIPTION OF THE DRAWINGS

For a more complete understanding of this invention, reference should now be made to the embodiments illustrated in greater detail in the accompanying drawings and described below by way of examples of the invention wherein.

DETAILED DESCRIPTION OF THE PREFERRED EMBODIMENT

Figure 1:
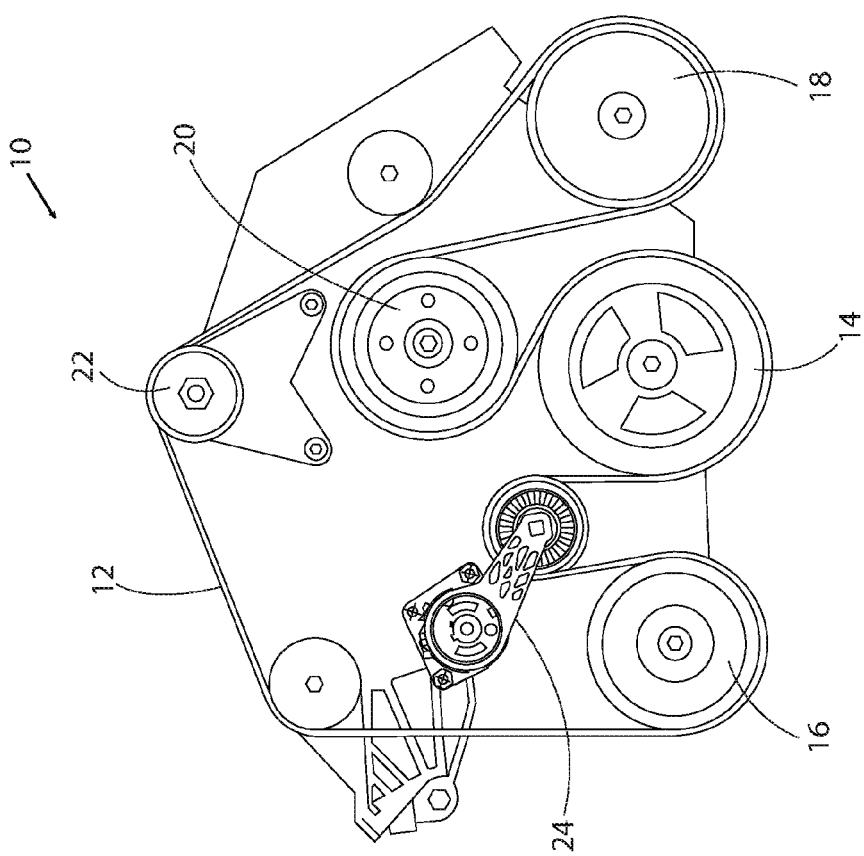
FIG. 1 is a frontal elevational view of an engine having an front end accessory drive automatic belt tensioner according to a known arrangement.

In the following figures, the same reference numerals will be used to refer to the same components. In the following description, various operating parameters and components are described for different constructed embodiments. These specific parameters and components are included as examples and are not meant to be limiting.

Figure 2:
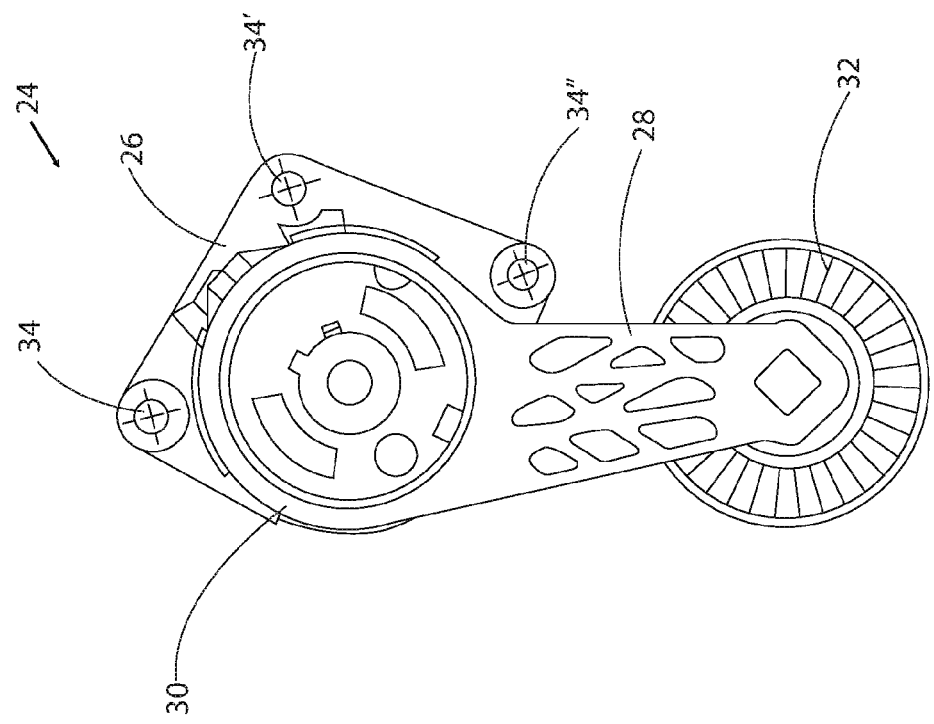
FIG. 2 is a detailed front view of the front end accessory drive automatic belt tensioner illustrated in FIG. 1 according to the prior art.
Figure 3:
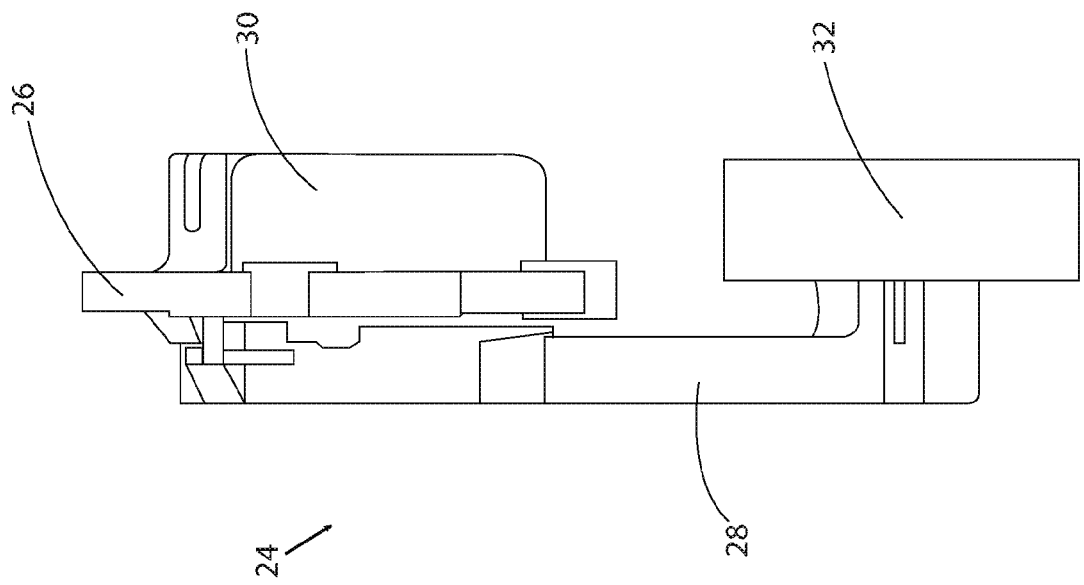
FIG. 3 is a detailed side view of the front end accessory drive automatic belt tensioner illustrated in FIG. 1 according to the prior art.
Figure 4:
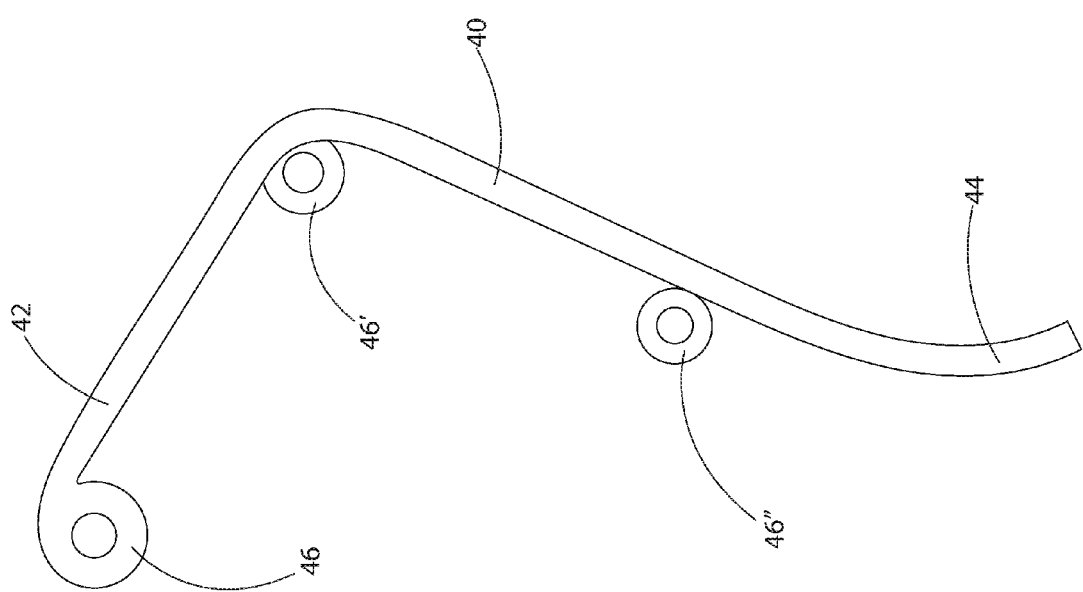
FIG. 4 illustrates a front view of an embodiment of the external spring according to the disclosed inventive concept.
Figure 5:
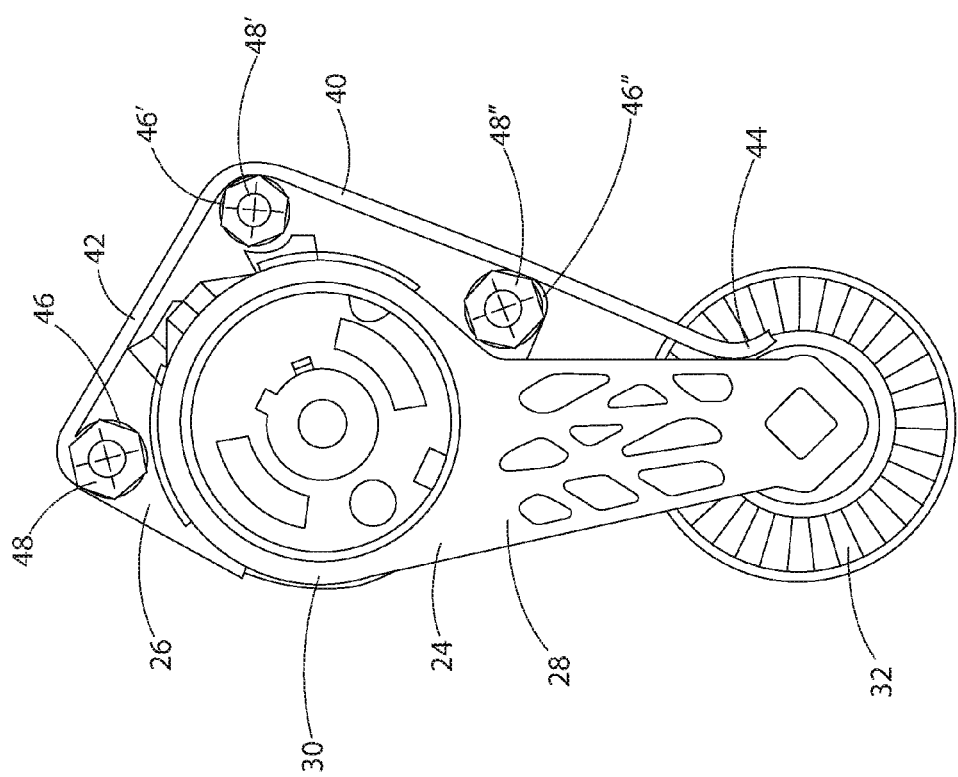
FIG. 5 illustrates a front view of a front end accessory drive automatic belt tensioner fitted with the external spring embodiment of FIG. 4.
Figure 6:
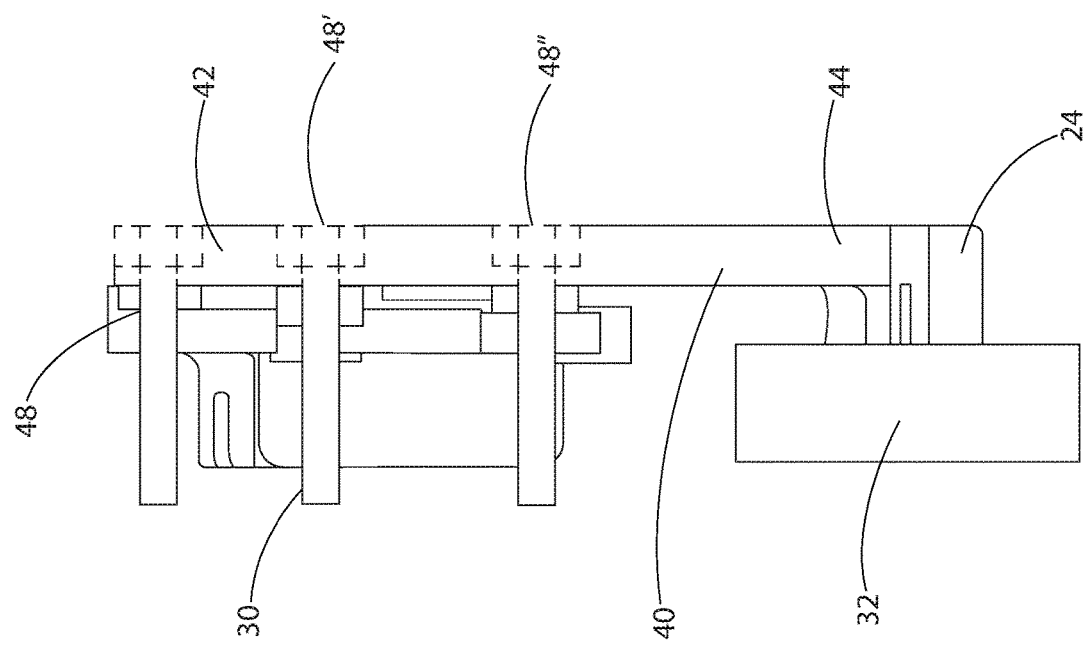
FIG. 6 illustrates a side view of a front end accessory drive automatic belt tensioner fitted with the external spring embodiment of FIG. 4.
Figure 7:
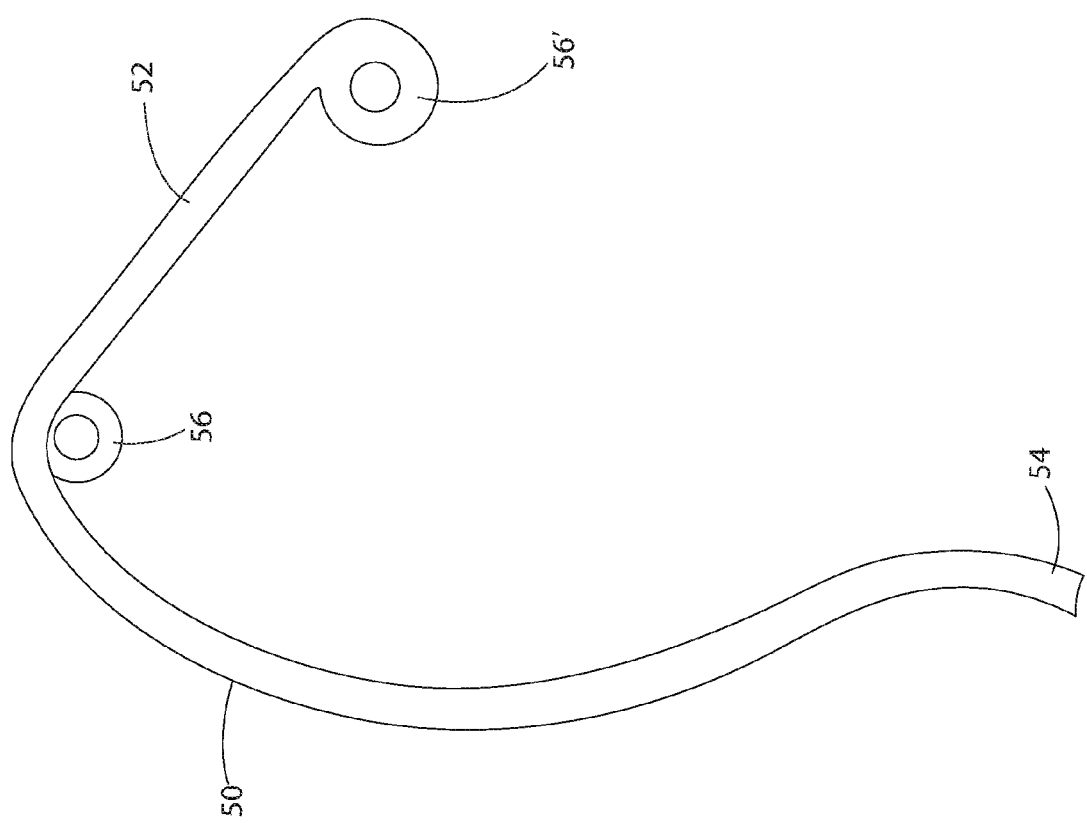
FIG. 7 illustrates a front view of another embodiment of the external spring according to the disclosed inventive concept.
Figure 8:
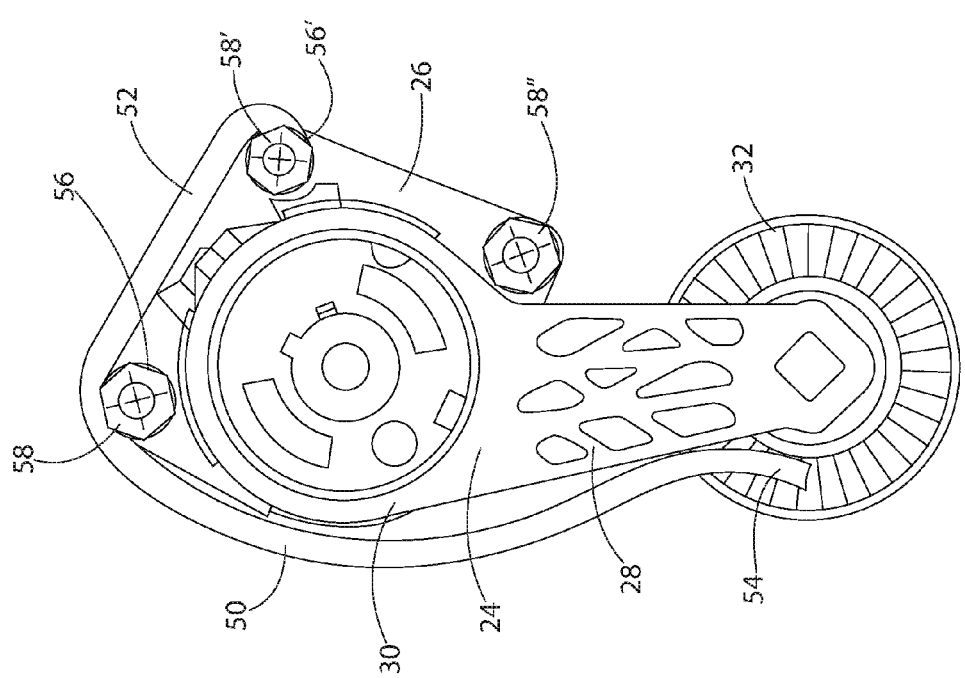
FIG. 8 illustrates a front view of a front end accessory drive automatic belt tensioner fitted with the external spring embodiment of FIG. 7.
Figure 9:
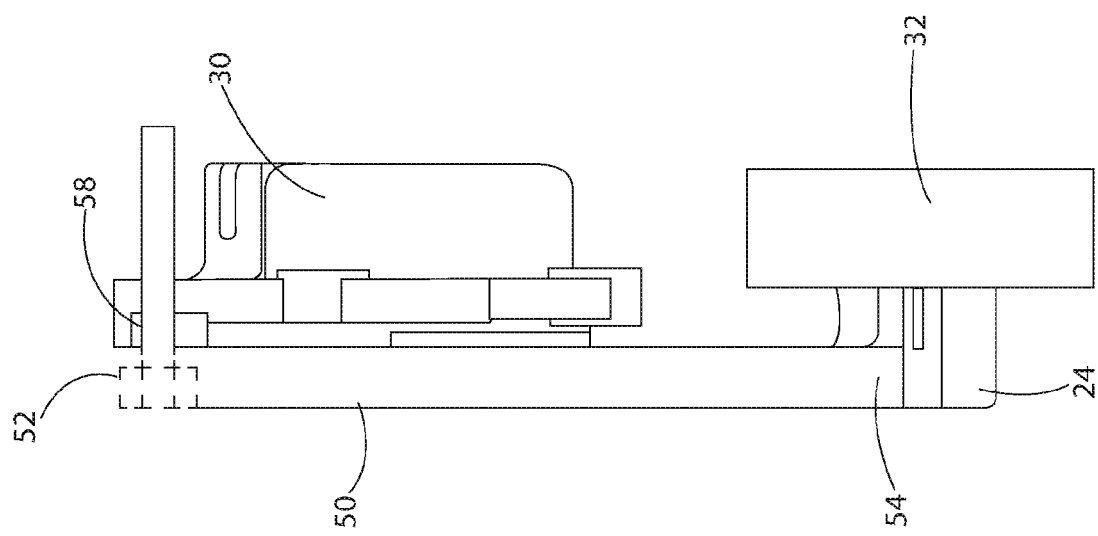
FIG. 9 illustrates a side view of a front end accessory drive automatic belt tensioner fitted with the external spring embodiment of FIG. 7.

In general, a conventional tensioner arrangement is illustrated in FIGS. 1 through 3. This conventional arrangement is only illustrative as variations of this arrangement are anticipated. Two embodiments of the disclosed inventive concept are illustrated. The first embodiment is illustrated in FIGS. 4 through 6 while the second embodiment is illustrated in FIGS. 7 through 9. It is to be understood that the precise configurations shown in FIGS. 4 through 9 are not intended as being limiting, as variations such as shape, position and size can be anticipated without deviating from either the spirit or the scope of the disclosed inventive concept.

As shown in FIG. 1, a front end accessory drive automatic belt tensioner is shown on the front of an engine, generally illustrated as 10. The engine 10 and its accessories is only illustrative. For example, while the illustrated engine is of a V-type (such as a V-8 or a V-6), the tensioner is also ordinarily found on other types of engines, including those having in-line arrangements.

While the number, type and placement of the driven accessories may be varied, the arrangement shown in FIG. 1 is typical. A flexible drive belt 12 of the serpentine type is provided to drive the accessories. Such accessories conventionally include a crankshaft pulley 14, an air conditioner compressor 16, a power steering pump 18, a water pump 20, and an alternator 22. Each of these accessories is driven by the drive belt 12, which is itself driven by the crankshaft pulley 14 which rotates with the engine's crankshaft.

A tensioner 24 is conventionally provided to prevent the flexible drive belt 12 from slipping during engine operation. The tensioner 24 is shown in detail in FIGS. 2 and 3. Referring thereto, the tensioner 24 includes a tensioner base 26 that is attached to the front of the engine 10 as illustrated in FIG. 1. Attachment of the tensioner base 26 to the front of the engine 10 is conventionally accomplished through the use of fasteners, such as threaded bolts (not shown).

The tensioner 24 applies tension to the flexible drive belt 12 by a rotating arm 28 that is rotatably attached to the tensioner base 26. A clock spring (not shown) is internally provided within a tensioner rotatable body that is formed at the rotating end of the tensioner arm 28 attached to the tensioner base 26. A tensioner pulley 32 is rotatably attached to the tension end of the rotating arm 28. The tensioner 24 delivers tension to the flexible drive belt 12 by rotating the rotating arm 28 in a counterclockwise direction so that the tensioner pulley 32 tightens the flexible drive belt 12.

As noted above, the tensioner is attached to the front of the engine 10 by fasteners, such as threaded bolts. The bolts are attached through fastener apertures 34, 34' and 34" to hold the tensioner 24 to the engine 10.

The disclosed inventive concept is illustrated in two embodiments shown in FIGS. 4 through 9 and discussed in relation thereto. In general, the disclosed inventive concept is directed to a spring that is applied externally to an existing tensioner to enhance the amount of tension applied to the flexible drive belt 12. The size and position of the external spring may be adjusted as desired to apply a specific amount of additional tension to the existing tensioner. In addition, the thickness, width, and type of material may also be adjusted as needed to apply the desired degree of supplemental tension.

Referring to FIGS. 4 through 6, a first embodiment of an external spring for use with a drive belt tensioner is illustrated. Particularly, an external spring 40 is illustrated that includes an attachment end 42 and a biasing end 44. The external spring 40 may be of different shapes, but, as illustrated, preferably includes at least one flat portion (in the attachment end 42) and an arcuate portion (in the biasing end 44).

Fastener sleeves 46, 46' and 46" are provided to attach the external spring 40 to the tensioner 24. The fastener sleeves 46, 46' and 46" may be formed as part of the external spring 40 or may be attached thereto by, for example, welding. As shown in FIGS. 5 and 6, a fastener 48 is fitted into the fastener sleeve 46, a fastener 48' is fitted into the fastener sleeve 46', and a fastener 48" is fitted into the fastener sleeve 46".

Also as shown in FIGS. 5 and 6, the attachment end 42 wraps substantially around the tensioner base 26 when the external spring 40 is attached to the tensioner 24. The biasing end 44 applies supplemental tension to the tensioner arm 28 so that the additional tension is translated to the tensioner pulley 32 and, consequently, to the flexible drive belt 12.

Referring to FIGS. 7 through 9, a second embodiment of an external spring for use with a drive belt tensioner is illustrated. As shown, an external spring 50 is illustrated that includes an attachment end 52 and a biasing end 54. As with the external spring 40 shown in FIGS. 4 through 6 and discussed in relation thereto, the external spring 50 may be of different shapes, but, as illustrated, preferably includes a flat portion (in the attachment end 52) and an arcuate portion (in the biasing end 54).

Fastener sleeves 56 and 56' are provided to attach the external spring 50 to the tensioner 24. The fastener sleeves 56 and 56' may be formed as part of the external spring 50 or may be attached thereto by any number of methods that include, for example, welding. As shown in FIGS. 8 and 9, a fastener 58 is fitted into the fastener sleeve 56 and a fastener 58' is fitted into the fastener sleeve 56'. A fastener 58" is used conventionally to attach the tensioner 24 to the engine 10.

The attachment end 52 wraps around a portion of the tensioner base 26 when the external spring 50 is attached to the tensioner 24 as shown particularly in FIG. 8. The biasing end 54 applies supplemental tension to the tensioner arm 28 so that the additional tension is translated to the tensioner pulley 32 and, consequently, to the flexible drive belt 12.

One skilled in the art will readily recognize from the above discussion, and from the accompanying drawings and claims, that various changes, modifications and variations can be made therein without departing from the true spirit and fair scope of the invention as defined by the following claims.

What is claimed is:

1. An external spring tensioner for use with a front end accessory drive automatic belt tensioner for an engine, the tensioner having an engine attachment housing and a tensioner arm, the arm having a tensioning pulley end, the tensioner comprising:
   a spring having attachment and biasing ends, said attachment end being externally attachable to the housing and said biasing end applying a biasing force against the pulley end; and
   attachment sleeves fixed to said attachment end.

2. The external spring tensioner of claim 1 including a fastener for each of said attachment sleeves, said fasteners being fitted through said attachment sleeves, the engine attachment housing, and into the engine.

3. The external spring tensioner of claim 1 in which said spring is a flat spring.

4. The external spring tensioner of claim 3 wherein said attachment end includes a flat portion and said biasing end includes an arcuate portion.

5. The external spring tensioner of claim 1 wherein said spring is composed of spring steel.

6. The external spring tensioner of claim 1 wherein said attachment sleeves are formed as part of said spring.

7. The external spring tensioner of claim 1 wherein said attachment sleeves are attached to said spring.

8. A tensioner arrangement for an engine, the arrangement comprising:
   a front end accessory drive automatic belt tensioner attached to the engine, said tensioner having an engine attachment housing and a tensioner arm, said arm having a tensioning pulley end;
   a spring having attachment and biasing ends, said attachment end being externally attachable to said housing and said biasing end applying a biasing force against the pulley end; and
   attachment sleeves fixed to said attachment end.

9. The tensioner arrangement of claim 8 including a fastener for each of said attachment sleeves, said fasteners being fitted through said attachment sleeves, said engine attachment housing, and into the engine.

10. The external spring tensioner of claim 8 in which said spring is a flat spring.

11. The external spring tensioner of claim 10 wherein said attachment end includes a flat portion and said biasing end includes an arcuate portion.

12. The external spring tensioner of claim 8 wherein said attachment sleeves are formed as part of said spring.

13. The external spring tensioner of claim 8 wherein said attachment sleeves are attached to said spring.

\* \* \* \* \*